358-84. OR 3,508,005 SR

SEARCH ROOM

INVENTOR
GERHART LOTHAR HAMBURGER
BY Young & Thompson
ATTYS.

INVENTOR
GERHART LOTHAR HAMBURGER
BY Young & Thompson
ATTYS.

INVENTOR
GERHART LOTHAR HAMBURGER
BY Young + Thompson
ATTYS.

INVENTOR
GERHART LOTHAR HAMBURGER
BY Young & Thompson
ATTYS.

United States Patent Office 3,508,005
Patented Apr. 21, 1970

3,508,005

PRICE CONTROL AND AUDIENCE MONITORING IN SUBSCRIPTION TELEVISION AND LIKE SYSTEMS

Gerhart Lothar Hamburger, Welwyn, England, assignor to Sangamo Weston Limited, Enfield, England, a British company Continuation-in-part of application Ser. No. 369,990, May 25, 1964. This application Dec. 18, 1967, Ser. No. 691,513
Int. Cl. H04h *9/00;* H04n *7/02, 7/16*
U.S. Cl. 178—6 8 Claims

ABSTRACT OF THE DISCLOSURE

Subscription television system in which each of the subscribers is connected in parallel by a wire conductor network to the signal transmitting station, in which the number of active subscribers is measured at regular intervals of, say, 3 minutes by first charging a capacitor in each subscriber's apparatus by a relatively long duration direct current pulse and then discharging such capacitors through current integrating means and in which pulse-operated metering means in each active subscriber's apparatus is operated by each of such charging pulses and by each of a series of much shorter duration pulses sent after the discharge period following each charging pulse but before the next following charging pulse. The number of short pulses is varied to alter the programme charge and such pulses may be sent immediately following the discharge period or spread out over the period preceding the next charging pulse or randomly distributed in time.

The present invention relates to subscription television or radio signal distribution systems in which each subscriber is connected to a source of signals by way of one or more wire conductor channels and is provided with metering means arranged to be advanced while the subscriber's apparatus in receiving signals over at least one of said channels, the rate of advance being determined by the charge to be levied for the particular programme being received. Such metering means may be of simple debit-registering form as in electricity supply meters or may be associated with coin-operated or like prepayment mechanism including switching means which control the operation of the subscriber's apparatus according to the credit condition of the prepayment mechanism so that reception of the programme is possible only when sufficient credit has been established and is terminated immediately the credit is exhausted.

This application is a continuation-in-part application from my earlier patent application Ser. No. 369,990 filed May 25, 1964 for "Subcription Television and Like Systems," now abandoned.

One proposed system of the general kind referred to above allows the rate of charging to be altered from time to time according to the determined price value of each programme and, in addition, enables the supplier of the distributed signal to measure the total number of subscribers who are taking the programme at any particular time instant and therefrom to determine the total value of money receivable for each separate distributed programme.

In such system, each subscriber's apparatus includes a capacitor connected in series with a stepping motor device across the line conductors of the channel carrying the programme concerned. A source of direct current at a given voltage is then connected across the line conductors, conveniently at the distribution centre or sub-station, in order to charge the line and each of the subscriber's capacitors to the source voltage. The thus-charged network is then discharged through an integrating meter and from the measured charge content the total connected capacitance and hence the number of connected subscribers can be assessed. At the same time the flow of current into and out of each subscriber's capacitor operates the associated stepping motor by one step to increase the registered debit or to reduce the credit established in the prepayment mechanism by a chosen amount. By repeating the cycle of operation described above a chosen number of times during the period of a particular programme it is possible not only to levy a chosen charge for the programme on each active subscriber but also to monitor substantially continuously the number of subscribers being charged at the chosen rate and therefrom to compute the total monetary receipts for the programme.

By way of example, if each pulse applied to charge the network is arranged to increase the debit or reduce the credit of each connected subscriber by an amount equivalent to $\frac{1}{20}$ of a penny and if such pulses are applied at the rate of one every 3 minutes, the levied charge is obviously at the rate of one penny per hour. If, on the other hand, the pulses are applied at the rate of one every 3 minutes the levied charge is at the rate of 5 shillings per hour.

Such an arrangement has certain inherent operational difficulties due, to a large extent, to the inherent self-capacitance, series resistance and leakage resistance of the conductor network. On this account it is necessary to provide each subscriber with a capacitor of substantial capacitance value, e.g. of the order of 10 microfarads, to enable ready differentation between different numbers of subscribers actively connected at any one time. The resultant capacitance value when several hundred subcribers are connected to the network, in conjunction with the average resistive values of the network, causes the latter to have a time constant which may be of the order of several seconds. This, in turn, sets an upper limit to the number of the aforesaid line charging pulses which can be transmitted in any given time period and hence limits either the maximum charge rate which can be levied for a given programme or, alternatively, makes it necessary to employ a unit charge value for each pulse which is inconveniently high for use when lower charge rates are required to be levied.

An object of the present invention is to provide a modified system avoiding such difficulties and according to which, instead of arranging that each pulse applied to the network operates as a subscriber number and monetary receipt assessing medium with the accompanying need for long duration pulses and a correspondingly long time interval bewteen successive pulses, at each predetermined unit time interval of, say, 3 minutes the network is supplied with a single long duration charging pulse followed immediately by a quiescent period sufficiently long to allow complete discharge of the line and effect assessment of the number of active subscribers and this, in turn, is then followed by a number of further much shorter pulses, such further pulses being of sufficient duration merely to effect operation of the consumers metering mechanism without effecting full charging of the line and its connected capacitance.

Measurement of the number of active subscribers can then still be effected at sufficiently frequent intervals to provide satisfactory computation of the monetary receipt value by multiplying the determined number of active subscribers by the particular charge rate as determined by the number of subsequent short pulses following each long charging pulse and its following discharge period.

In order that the nature of the invention may be more readily understood a number of embodiments thereof will now be described by way of illustrative example and with reference to the accompanying drawings in which:

FIGURE 9 is a waveform diagram similar to those of FIGS. 4 and 6, showing another modification of the invention while

Figure 1:
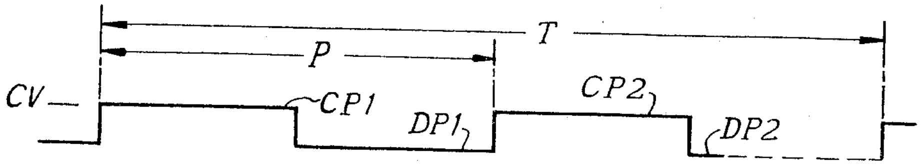
FIGURE 1 is a wave form diagram illustrating the form of signal used in the known system already referred to and transmitted from a common monitoring point to the various subscribers.
Figure 2:
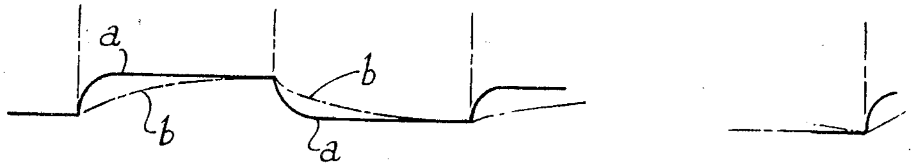
FIGURE 2 is a similar diagram illustrating the resultant current flow in a subscriber's metering means.

Referring first to FIG. 1, in the already known system previously referred to and which is briefly described in U.S.A. Patent No. 3,269,988, during a given unit time period T, e.g. 3 minutes, the signal supply network has applied thereto from a common charging point a plurality of capacitor charging pulses CP1, CP2 . . . whose number is required to be variable over a considerable range in order to permit alteration of the charge levied for the programme then being supplied. Owing to the long time constant of the network and the widely varying $R/C$ parameters effective at different points of the network it is necessary to maintain the charging voltage of each charging pulse for a considerable period of time in order to ensure that all of the subscribers capacitors are fully charged to the charging source voltage. This is illustrated in FIG. 2 where charging voltage curve $a$ indicates the condition at a subscriber near the charging point whereas curve $b$ indicates the condition at a subscriber remote from such charging point. In similar manner the following discharge periods DP1, DP2 . . . must be sufficiently prolonged to ensure complete discharge through the integrating mechanism of the central recording point (conveniently coincident with the charging point) of all of the capacitors of the subscribers who are at the time actively connected to the network. There is thus a minimum time period P between successive charging pulses and the maximum number of such charging pulses which can be accommodated within the limited period T is $T/P$. It is convenient to have the unit periods T of constant duration through the period of programme supply.

Figure 3:
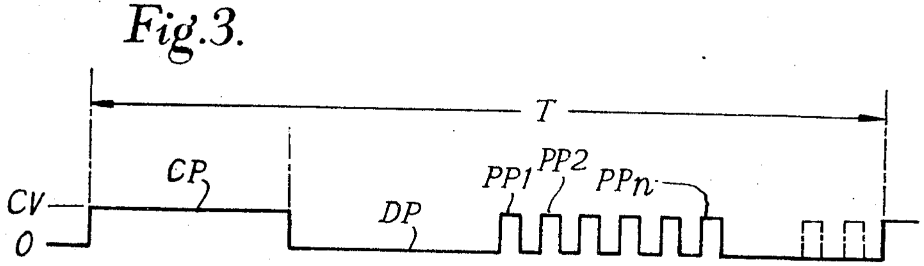
FIGURE 3 is a waveform diagram corresponding to FIG. 1, but showing the modified form of signal used in accordance with one embodiment of the present invention.

FIG. 3 illustrates one modified scheme according to the present invention in which, over the same unit time period T, following an initial charging pulse period CP of a duration at least as long as the minimum permissible time as described above in connection with FIGS. 1 and 2, a single discharge period DP of similarly adequate duration is provided to allow discharge of the line through the integrating mechanism at the recording point. After this discharge period, however, instead of further charging pulses each followed by prolonged discharge periods, a series of relatively short duration price pulses PP1, PP2 . . . PP$n$, appropriate in number for the particular charge rate to be levied, are supplied to the line in relatively rapid succession whereafter the line is left in the discharged condition until the next following repetition of the cycle in the next following time period T. The price pulses PP1 . . . PP$n$ and the periods between them need be of a duration sufficient only to ensure reliable operation of the stepping motor means at the most remote subscriber and are too short fully to charge or discharge the line network. In consequence the number which can be accommodated within any period T is relatively large and a wide range of variation of the charge rate levied for a programme is readily achieved.

Figure 5:
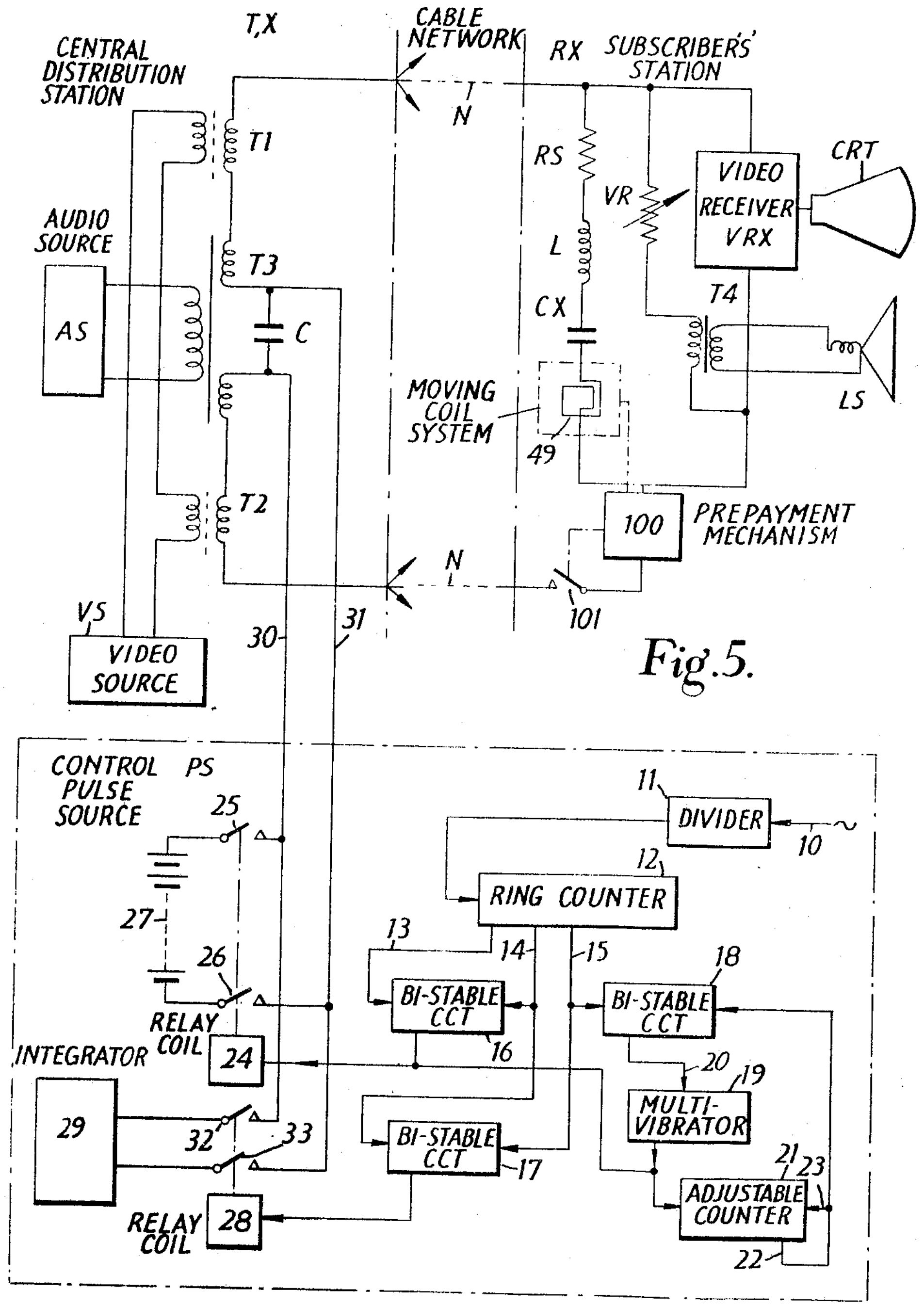
FIGURE 5 is a circuit diagram, largely of block schematic character, showing one form of subscription television system for carrying out the invention.

FIGURE 5 shows one form of subscriber's television system arranged for operation in accordance with the invention. This system comprises a central transmitting or distribution station TX and a plurality of subscribers' receiving stations of which one only is shown at RX. Signals comprising video, audio and charge controlling pulse signals are transmitted from the distribution station TX to the various subscribers' stations RX by way of a line or cable network N, the various subscribers' stations being connected to the network in parallel.

The distribution station TX includes a video signal source VS supplying video signals by way of a balanced pair of transformers T1, T2 and an audio signal source AS supplying audio signals by way of a transformer T3 having a two-section secondary winding for allowing the injection of the requisite charge controlling pulses from a control pulse source PS. Such charge controlling pulses are of direct current form varying between zero and, say, 50 v. while the audio signal on the line network may be of the order of 100 v. maximum amplitude. Capacitor C provides a shunt of low impedance to video signals across the pulse source PS while further capacitors (not shown) may also be provided in shunt with the secondary winding sections of the transformer T3 to provide a low impedance path for the video signals across such sections.

At each of the subscriber's stations RX switching means 101, structurally within prepayment mechanism 100 controls the connection of the line N to a video signal receiver VRX and its associated picture tube CRT and, through a volume control resistor VR to an audio output transformer T4 feeding a loudspeaker LS. Also connected in shunt across the line N through the controlled switch means in the prepayment mechanism 100 is the coil winding 49 of a moving coil instrument movement which is coupled to and governs an escapement mechanism which, in turn, controls the credit registering means of the prepayment mechanism as described in detail in the aforesaid U.S.A. Patent No. 3,269,988. Connection of the coil winding 49 is made through a capacitor CX of accurately known and comparatively large capacitance value, e.g. 10 microfarads, and a series connected choke coil L and resistance RS.

The pulse source PS comprises a pulse frequency divider device 11 of any suitable known form which is continuously supplied with a constant frequency alternating input over line 10. Such input is conveniently at 60 c.p.s. derived from the public supply mains. A pulse output from the divider device 11 at, say, a frequency of one pulse per second, is fed to the input of a multistage pulse counter 12 of the well known ring type which operates through a complete count cycle of known number and then automatically resets to zero. The count number in the present instance is conveniently 180, i.e. equivalent to a unit period of time T of 3 minutes. The counter 12 has a plurality of separate outputs from different count stages thereof shown at 13, 14 and 15. The output 13 is energized when the counter 12 is in its zero or reset state, the output 14 is energised when the counter count state is, say, 10, equivalent to a time period of 10 seconds following energisation of the output 13 while the further output 15 is energised when the count state of the counter 12 is 20, i.e. after a further time interval of 10 seconds following energisation of the output 14.

The pulse output 13 is applied as the setting input to a bi-stable or trigger circuit 16, e.g. of the well known Eccles-Jordan type. The reset input of such trigger circuit 16 is connected to the pulse output 14 of the counter 12. A further similar bi-stable trigger circuit 17 has its setting input connected to the output 14 of the counter 12 and its reset input to the output 15 of such ring counter. A third bi-stable trigger circuit 18 has, in similar manner, its setting input connected to the counter output 15.

The output from the trigger circuit 18 which is energised whilst the trigger circuit is in its set-on condition is connected to an operation control input of a multi-vibrator circuit 19 arranged to operate at its chosen frequency only when the said input 20 is energised. The multi-vibrator circuit 19, again of any well known form, provides a square wave output having a period time of 1 second and this output is fed as the pulse input to a pulse counting circuit 21 which, in known manner, provides an output signal on its output 22 when the total number of input pulses thereto reaches a predetermined and adjustable value. Such counter 21 is provided with a reset to zero input 23 while provision is made for connection of the output 22 to any one of its plurality of stages to allow adjustment of the number of input pulses counted before the output signal is provided. The counter output 22 of the adjustable counter 21 is fed to the reset input 23 of such counter whereby it is automatically reset to zero when the chosen count is reached. Such output 22 is also connected to supply the reset input of the trigger circuit 18.

A relay coil winding 24 or equivalent control means of a switching device illustrated for simplicity as mechanical switches 25 and 26, is connected to be energised by the on-state output from the trigger circuit 16 and by the pulse output from the multi-vibrator circuit 19. Such switches 25 and 26 control the connection of a source of D.C. potential 27, shown as a 50 v. battery, across the leads 30, 31 from the transformer T3. The switches 25, 26 are normally open but are closed whenever the trigger circuit 16 is set on and also during the time of each of the square pulses provided by the multi-vibrator circuit 19. A further relay coil or equivalent operating element 28 of a further switching device again shown as mechanical switches 32, 33, is connected to be energised by the output from the trigger circuit 17. These switches 32, 33 are closed only when the trigger circuit 17 is set on and serve then to connect the leads 30 and 31 to current integrator means 29, the form of which is described in greater detail in my co-pending application Ser. No. 369,989 filed May 25, 1964 for "Electrical Capacitance Measuring Method and Apparatus with Digital Form Indication, now abandoned." Such integrator mechanism is concerned with measurement of the number of active subscribers at any time taking signals from the network but, as it is not directly concerned with the present invention, it will not be further described.

In the operation of the arrangement shown in FIG. 5, the ring counter 12 is returned to zero once every 3 minutes. At this instant the trigger circuit 16 is set on and causes relay coil 24 to operate to close switches 25, 26 whereby the battery 27 supplies current to the network N to start the pulse CP (FIGS. 3 and 4) to charge the line network N and each of the active subscribers' capacitors CX. Whenever a subscriber is taking signals from the network switch 101 is closed. At the end of 10 seconds from such zero instant, the output 14 of counter 12 is energised. This resets the trigger circuit 16 to de-energise the relay coil 24 to open switches 25, 26 and hence terminate the charging pulse CP. Simultaneously trigger circuit 17 is set on to cause relay coil 28 to operate to close switches 32, 33 whereby the integrator means 29 is connected across the line N during the following discharge period DP (FIGS. 3 and 4) in order to allow measurement of the number of active subscribers. At the time 20 seconds from the zero count of the counter 12, output 15 becomes energised to reset the trigger circuit 17 thereby de-energising relay coil 28 and opening switches 32, 33. Simultaneously the trigger circuit 18 is set on. The energised output from this trigger circuit, by application to control input 20 of the multi-vibrator circuit 19, causes the latter to commence operation. The one cycle per second square wave output from the circuit 19 provides a series of square wave pulses each of one half second duration to cause intermittent energisation of the relay coil 24 and the consequent application of a series of half second D.C. pulses to the line N and the active subscriber's metering means. At the same time the adjustable counter 21 is stepped on each of said short pulses. When the number of these reaches the chosen count value of the counter 21, the output therefrom resets the trigger circuit 18 off and simultaneously resets the counter 21 to zero. When trigger circuit 18 is set off the multi-vibrator circuit operation is stopped and no further operation takes place until, at the end of 3 minutes, the ring counter 12 again returns to the zero count state whereupon the cycle of operations is repeated.

It is possible for a subscriber, either by electrical examination of the incoming signals or by audio investigation of the stepping mechanism in his receiver, to anticipate with reasonable accuracy the times of arrival of each of the recurrent line and capacitor charging pulses and the following groups of so-called price pulses. By momentarily switching off his apparatus or the supply of input signals thereto during at least each period of price pulses, a subscriber may be able to reduce or even avoid the credit reducing operation of his prepayment mechanism with consequent avoidance of the payment due for the programme being received during the intervening time periods. When a similar system is applied to the control of metering means operating upon a credit instead of a prepayment basis, there is a similar risk of avoidance of proper registration of the charge due.

A modified system by which such risk of fraudulent operation by a subscriber may be greatly reduced or even eliminated will now be described with reference to FIG. 6.

Referring first to the waveform diagram of FIG. 4 which illustrates three successive periods T of the system described with reference to FIG. 5, in each unit time period T, e.g. of 3 minutes duration, the network of line conductors N supplying the various subscribers has current applied thereto an initial charging pulse period CP. This is followed by a discharge period DP of adequate duration to allow discharge of the line network including the capacitors of the subscribers then active through the integrating means at a common recording point. After the lapse of this discharge period DP which preferably includes a further quiescent period sufficient to permit operation at the common recording point of means for reading and/or registering the integrated discharge current, a series of relatively short or price pulses PP1, PP2 . . . PP$n$, appropriate in number for the particular charge rate to be levied, are applied to the line network in rapid succession for the purpose of operating the stepping mechanism in each active subscriber's apparatus. The waveform of the applied pulses is the same in each unit time period T over any programme period when the charge rate remains unaltered. The number of operations of each subscriber's mechanism is equal to the number of price pulses plus one, that due to the initial charging pulse CP.

Figure 6:
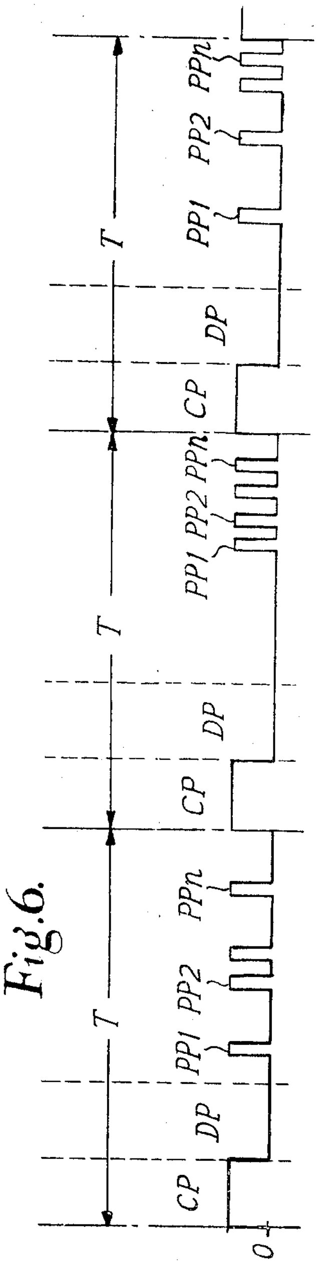
FIGURE 6 is a waveform diagram similar to FIG. 5 showing the modified form of signal used in accordance with an alternative embodiment of the invention.

FIG. 6 illustrates one typical waveform in the modified system. Each unit time period T again includes a charging pulse period CP and a following discharge period DP, but the subsequent price pulses PP1, PP2 . . . PP$n$ are distributed in completely random manner over the remainder of the period T available before the next following charging pulse CP of the subsequent period T. Although the number of the price pulses PP1 . . . PP$n$ in each period T is the same, their time distribution in successive unit time periods is preferably completely different, again in random manner.

Figure 7:
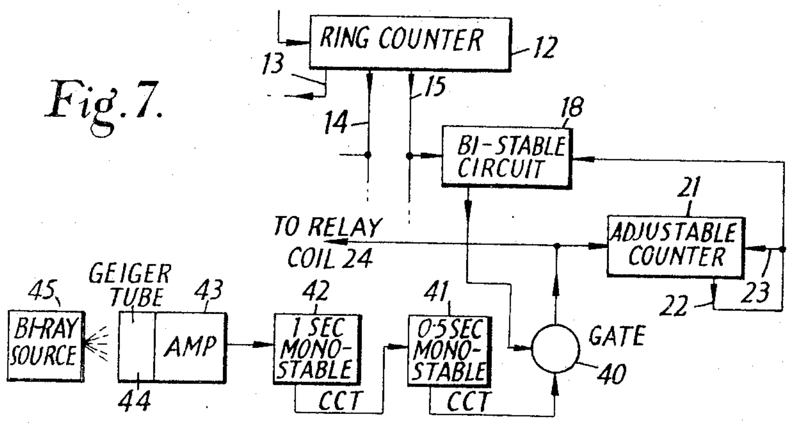
FIGURE 7 is a fragmentary circuit diagram, also of mainly block schematic form, illustrating an alternative arrangement of part of the apparatus arrangement shown in FIG. 5, in order to provide a signal of the form shown in FIG. 6.

FIGURE 7 shows the modifications of the arrangements already described with reference to FIG. 5, necessary to provide such random timing of the price pulses PP1 . . . PP$n$. In this FIG. 7, which is intended to be read in conjunction with FIG. 5, similar components have been given similar reference characters.

The arrangements controlling the basic period timing and the charging and discharging periods are the same as those of FIG. 5. The output 15 from the counter circuit 12, energised at time 20 seconds from the zero count of the counter, e.g. at the end of the discharge period DP, serves to set on the bistable trigger circuit 18 and the resultant on-state output from the latter provides one control input to an AND gate 40. A second control input to such gate 40 is derived from the on-state output of a monostable trigger circuit 41 providing a half-second duration output pulse in response to each setting pulse applied to its set input. Such set input is supplied via a differentiating network from the on-state output of a second monostable trigger circuit 42 which provides a one-second duration output pulse in response to input signals applied to its set input. Signals for such set input of the trigger circuit 42 are provided by the output of an amplifier 43 coupled to a Geiger tube 44 which is continuously exposed to a suitable source 45 of B-rays. The B-ray source 45, Geiger tube 44, amplifier 43 and monostable trigger circuits 42, 41 may be of any well known form. The trigger circuit 42 is arranged so that, once it has been set-on by a triggering pulse, it is insensitive to any further triggering pulses until after it has reverted to its normal off state.

The output from the AND gate 40 provides the second control for the relay coil 24 in addition to that given by the output from trigger circuit 16 as in FIG. 5. Such gate output is also applied to the pulse input of an adjustable pulse counter circuit 21. The latter corresponds to the similar component of the arrangement shown in FIG. 5 and has its count output connected to its own reset-to-zero input and to the reset input of the trigger circuit 18.

The manner of operation of this modification is similar to that of the arrangement of FIG. 5 except that, upon termination of the discharge period DP in each 3-minute interval T, the trigger circuit 18 becomes set-on thereby conditioning the AND gate 40. The B-rays falling on the Geiger tube 44 provide a series of sporadic pulses with completely random timing at the output of amplifier 43. Those which occur at intervals of not less than one second each set the trigger circuit 42 to the on-state for 1 second. Consequent upon the start of each of such 1-second pulses from the trigger circuit 42, the trigger circuit 41 provides a half-second pulse followed by a quiescent period of at least one-half of a second. Such half-second pulses then pass the now-conditioned AND gate 40 and operate the relay coil 24 correspondingly at then random timing. Simultaneously each pulse passing the gate 40 is counted by the counter 21. When the latter reaches the chosen count state value, its output resets itself to zero and at the same time resets the trigger circuit 18. This closes the AND gate 40 to prevent the passage of any further pulse from the trigger circuit 41 until the cycle of events is repeated at the end of the next following discharge period DP.

Figure 8:
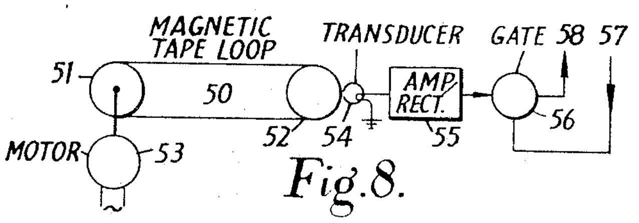
FIGURE 8 is another fragmentary circuit diagram, showing an alternative modification of the arrangements of FIG. 5 to provide randomly timed price pulses as shown in FIG. 6.

FIGURE 8 shows another manner of modifying the arrangements of FIGURE 5 in order to provide the desired short time price pulses with a random timing. This arrangement comprises a magnetic recording tape loop 50 which is continuously moved around its endless path over drums 51, 52 by a continuously energised motor 53. Upon this tape is previously recorded a series of pulses with completely random time spacing. Such recording may be derived, for example, from any suitable known form of random noise signal sources such as a Beta source as already described in FIG. 7, or a diode source. A magneto-electric transducer or reproducing head 54 of any convenient known form, positioned to respond to the recording pulse signals on the tape loop 50, feeds its output signals to an amplifier/rectifier network 55 which provides a D.C. pulse of, say, half-second duration for each output pulse signal provided by the head 54. These pulse signals are applied as the control input of a gate circuit 56 which is connected by an input lead 57 to the output 20 of the trigger circuit 18 in FIGURE 5 and by an output lead 58 to the relay coil 24 of such FIGURE 5. The lead 58 is also connected to the input of the adjustable counter 21 of FIGURE 5. The multivibrator circuit 19 of FIGURE 5 is omitted.

The tape loop 50 has a total cycle time which is greater than the three minute unit period T and which is not an integral multiple of the time period T. Conveniently it is of the order of 7 minutes. The randomly distributed pulses recorded on the tape loop during any 3 minute playback portion thereof should be greater than the number of short pulses ever required to be transmitted in any one period T.

The manner of operation is virtually identical with that previously described in connection with FIGURE 5 except that, instead of having an even time distribution as determined by the multi-vibrator 19 of FIGURE 5, the setting on of the trigger circuit 18 at the end of 20 seconds from the start of each cycle causes a series of randomly time distributed pulse signals from the tape loop 50 to be applied to the gate 56 whereby the energised output 20 of the trigger circuit 18 is intermittently and randomly connected to operate the relay coil 24 and simultaneously to advance the counter 21. As in the previous embodiments, the arrival of the counter 21 at its adjustable but predetermined count state causes resetting of the trigger circuit 18 and consequent closure of the gate 56 to prevent any further pulses being applied to the line N until the appropriate instant in the next following 3-minute unit period T.

Figure 4:
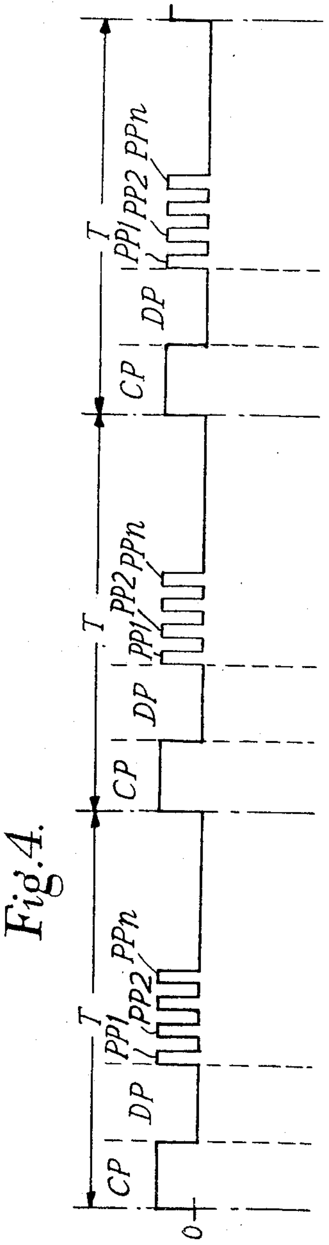
FIGURE 4 is a waveform diagram similar to that of FIG. 3 but extended to show three successive period times.

Another alternative to the use, during each period T, of a group of price pulses which are randomly timed relative to each other, is the use of a regularly timed series as in FIGS. 4 and 5 but which starts at random time instants following the end of the discharge period DP in successive periods T. Such alternative may be achieved by including a gate circuit in the connection between the output 15 of the ring counter 12 and the triggering input of the trigger circuit 18, FIG. 5 and then controlling the opening of such gate circuit by a randomly timed pulse derived, for example, from the amplifier 43, FIG. 7 or the amplifier/rectifier circuit 55, FIG. 8.

Figure 9:
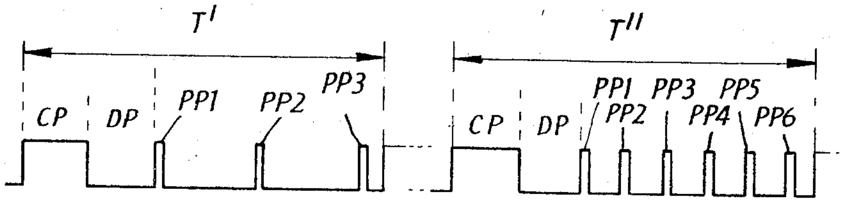

Yet another alternative system to prevent fraudulent operation is to spread the chosen number of price pulses PP over the whole of the available time interval between the end of the discharge period DP of one period T and the start of the charging period CP of the next following period T. This is shown in FIG. 9 where, in period T′ only three price pulses PP1, PP2 and PP3 are shown provided at regular intervals following the end of the discharge period DP. In period T″ (for a different programme charge rate), six price pulses PP1, PP2 . . . PP6 are shown provided again at regular intervals so as effectively to cover the whole of the available time interval.

Figure 10:
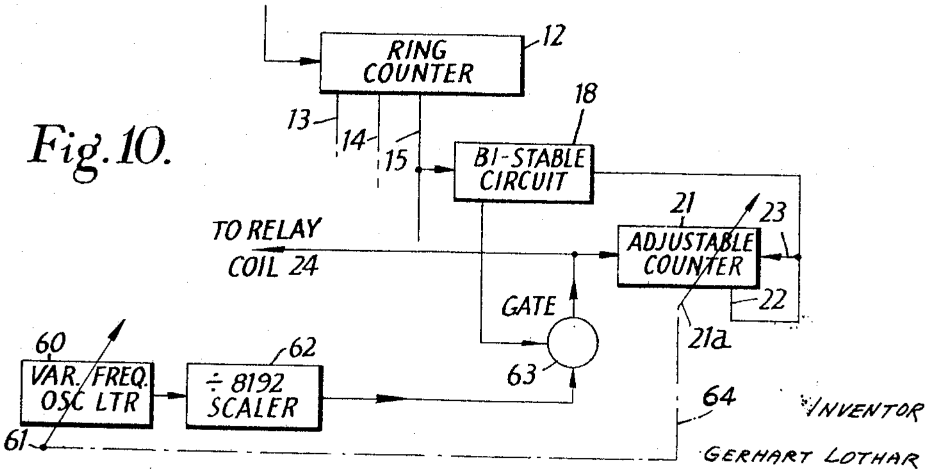
FIGURE 10 is a further fragmentary circuit diagram showing one manner of further modification of the arrangements of FIG. 5 to provide a signal of the form shown in FIG. 9.

FIG. 10 shows the modifications to the arrangements of FIG. 5, necessary to carry out this further alternative scheme. In this arrangement an audio oscillator 60, whose output frequency can be altered over a range of, say 50 c.p.s. to 6000 c.p.s., by a manual control 61, either continuously or in discrete steps, has its output connected to a divider or scaler circuit 62 of any suitable known form. Such scaler may be a conventional binary divider circuit effecting division by 8192. The lower frequency output from the scaler provides a pulse input to an AND gate 63 whose other, control, input is provided by the on-state output of the trigger circuit 18, FIG. 5. The gate output corresponds to the output of the multivibrator 19, FIG. 5 (which is eliminated) and is used as the price pulse control for the relay coil 24 and as the input to the adjustable counter 21. The count control 21*a* of such counter 21 is mechanically ganged as by means 64 to the frequency control 61 of the oscillator 60 in such manner that the number of pulses available in the divided oscillator output during the available price pulse period of each period T, FIG. 9, is very slightly greater than the corresponding pulse count setting of the counter 21.

The manner of operation will be self-apparent. Upon opening of the gate 63 after the end of the discharge period DP, pulses at appropriately adjustable but regular intervals from the scaler 62 serve to operate the relay coil 24 and also to advance the counter 21. When the latter reaches the chosen count state, dependent upon the price to be charged, the counter is reset, the trigger circuit 18 is reset and gate 63 is closed until the end of the next following discharge period DP whereupon the cycle is repeated.

While the charging and price pulses are conveniently applied to the actual cable network by which the programme signals are distributed, it will be evident that they may be applied to a separate control or other network if this is available.

I claim:

1. In a subscription television or radio signal distribution system wherein each subscriber is connected to a source of signals by a wire conductor channel and is provided with metering means operated whilst the subscriber's apparatus is receiving signals at a rate which determines the charge to be levied for the programme being supplied; the improvement comprising cyclically operating timing means providing separate first and second operation control outputs at a first and second instants of time in each operation cycle thereof, a current source, signal controlled switching means to connect said current source to said wire conductor channel, first control means operated by said first operation control output to operate said switching means to supply to said wire conductor channel an initial current pulse of duration sufficient fully to charge the channel and its connected capacitance, and second control means operated by said second operation control output to operate said switching means to supply a group of further current pulses to said wire conductor channel after an interval following the termination of said initial current pulse which is at least equal to the duration of such pulse, said group of further current pulses having each a time duration which is shorter than the time duration of said initial current pulse and which is insufficient fully to charge the channel and its connected capacitance.

2. A subscription television or radio signal distribution system as claimed in claim 1 in which said second control means includes pulse counting means to provide an output upon reaching a count state of chosen but variable value, said output being operative to terminate the group of further current pulses.

3. A subscription television or radio signal distribution system according to claim 1 in which said initial and said further current pulses are each unidirectional and all have the same polarity.

4. A subscription television or radio signal distribution system according to claim 1 in which said second control means includes randomly operating timing means causing said further current pulses to be distributed in random manner over the time period available between the end of the chosen time interval following each initial current pulse and the beginning of the next following initial current pulse.

5. A subscription television or radio signal distribution system according to claim 4 in which said randomly operative timing means cause the distribution of said further current pulses during the successive unit time periods between the series of initial current pulses also to be varied in random manner.

6. A subscription television or radio signal distribution system according to claim 1 in which the successive initial current pulses are transmitted at a constant rate.

7. A subscription television or radio signal distribution system according to claim 6 in which the said further current pulses of each group are evenly time spaced from one another.

8. A subscription television or radio signal distribution system according to claim 7 in which the first pulse of each group of said further current pulses occurs immediately subsequent to the end of said discharge period.

References Cited

UNITED STATES PATENTS

| | | | |
|---|---|---|---|
| 3,119,558 | 1/1964 | Kinross | 178—5.1 |
| 3,184,538 | 5/1965 | Court | 178—5.1 |
| 3,249,689 | 5/1966 | Davis et al. | 178—5.1 |
| 3,387,082 | 5/1968 | Farber | 178—5.1 XR |
| 3,399,271 | 8/1968 | Butcher et al. | 325—31 |

ROBERT L. GRIFFIN, Primary Examiner

H. W. BRITTON Assistant Examiner

U.S. Cl. X.R.

178—5.1; 325—31